(12) United States Patent
Davis

(10) Patent No.: US 11,302,212 B1
(45) Date of Patent: Apr. 12, 2022

(54) DEVICE FOR TEACHING MUSIC PERFORMANCE THROUGH TACTILE PITCH ASSOCIATION AND METHODS OF USE

(71) Applicant: Robin Davis, Memphis, TN (US)

(72) Inventor: Robin Davis, Memphis, TN (US)

(*) Notice: Subject to any disclaimer, the term of this patent is extended or adjusted under 35 U.S.C. 154(b) by 0 days.

(21) Appl. No.: 17/549,467

(22) Filed: Dec. 13, 2021

Related U.S. Application Data (60) Provisional application No. 63/124,318, filed on Dec. 11, 2020.

(51) Int. Cl.
*G09B 15/02* (2006.01)
*G10G 1/02* (2006.01)
*G09B 15/00* (2006.01)

(52) U.S. Cl.
CPC .......... *G09B 15/026* (2013.01); *G10G 1/02* (2013.01); *G09B 15/004* (2013.01)

(58) Field of Classification Search
CPC ....... G09B 15/026; G09B 15/004; G10G 1/02
See application file for complete search history.

(56) References Cited

U.S. PATENT DOCUMENTS

| | | | | |
|---|---|---|---|---|
| 510,302 A * | 12/1893 | Thew | ............... | G09B 15/026 84/472 |
| 618,611 A * | 1/1899 | Palmer | ............ | G09B 15/026 84/472 |
| 699,510 A * | 5/1902 | Forfar | ............... | G09B 15/026 84/472 |
| 939,127 A * | 11/1909 | Giffin | ............... | G09B 15/026 273/282.1 |
| 1,000,448 A * | 8/1911 | Stage | ................ | G09B 15/026 84/472 |
| 1,286,785 A * | 12/1918 | Robbins | ............ | G09B 15/026 84/472 |
| 1,319,919 A * | 10/1919 | Barker | ............. | G09B 15/026 84/484 |
| 1,412,587 A * | 4/1922 | Willoughby | ....... | G09B 15/026 84/471 R |
| 1,431,529 A * | 10/1922 | De La Parelle | ..... | G09B 15/026 84/476 |
| 1,433,850 A * | 10/1922 | Schnitker | ........... | G09B 15/026 40/621 |

(Continued)

*Primary Examiner* — Robert W Horn
(74) *Attorney, Agent, or Firm* — Hulsey P.C.

(57) ABSTRACT

Device and method for teaching/learning music including a board having horizontal lines with spaces therebetween, representing a musical staff. The device includes first insertion slots arranged in the musical staff. The first insertion slots match keys of a keyboard musical instrument. The device includes second insertion slots arranged in parallel to the first insertion slots. Each of the second insertion slots indicates an accidental sign with adjacent first insertion slots. The device includes first pegs configured to insert in the first insertion slots. The device includes second pegs configured to insert in second insertion slots to indicate an accidental sign. The device includes interchangeably clefs individually placed when needed adjacent to the musical staff. The first pegs insert in the first insertion slots, and the second pegs insert in the second insertion slots such that their position indicates a musical tone corresponding to pitch produced by the keyboard musical instrument.

20 Claims, 6 Drawing Sheets

(56) References Cited

U.S. PATENT DOCUMENTS

| | | | | | |
|---|---|---|---|---|---|
| 1,526,547 | A | * | 2/1925 | Hughey | G09B 15/026 283/44 |
| 1,637,478 | A | * | 8/1927 | Downs | G09B 15/026 84/471 R |
| 1,754,458 | A | * | 4/1930 | Cash | G09B 15/026 84/471 R |
| 1,805,488 | A | * | 5/1931 | Jolls | G09B 15/026 84/471 R |
| 1,858,140 | A | * | 5/1932 | Dewhirst | G09B 15/026 84/471 R |
| 2,082,432 | A | * | 6/1937 | Von Der Linden | G09B 15/026 40/620 |
| 2,164,873 | A | * | 7/1939 | Everson | G09B 15/026 84/471 R |
| 2,409,366 | A | * | 10/1946 | Lang | G09B 15/026 211/123 |
| 2,447,213 | A | * | 8/1948 | Sledge | G09B 15/026 84/470 R |
| 2,742,810 | A | * | 4/1956 | Kylin | G09B 15/026 84/471 R |
| 2,772,595 | A | * | 12/1956 | Cutlip | G09B 15/026 84/472 |
| 4,464,971 | A | * | 8/1984 | Dean | G09B 15/026 84/472 |
| 4,736,665 | A | * | 4/1988 | Sorribes Arambul | G09B 15/026 84/476 |
| 5,574,238 | A | * | 11/1996 | Mencher | G09B 15/026 84/478 |

* cited by examiner

DEVICE FOR TEACHING MUSIC PERFORMANCE THROUGH TACTILE PITCH ASSOCIATION AND METHODS OF USE

CROSS-REFERENCE TO RELATED APPLICATIONS

The present application claims priority from U.S. Provisional Patent Application Ser. No. 63/124,318, titled "DEVICE FOR TEACHING MUSIC PERFORMANCE THROUGH TACTILE PITCH ASSOCIATION, filed on Dec. 11, 2020, which is incorporated herein by its entirety and referenced thereto.

FIELD OF THE INVENTION

The present invention generally relates to a device for teaching music. More specifically, the present invention relates to a device for teaching a musical novice or children at the beginning stage of music reading, writing and playing a keyboard musical instrument such as a piano.

BACKGROUND OF THE INVENTION

The traditional method of teaching music to a musical novice or children includes a teacher teaching a student how to read music such as the names of the notes, clefs, etc. As known, musical notes include seven different letter names i.e., "A" through "G." Teaching music further includes teaching hand placement and fingering such as where the notes are on a keyboard musical instrument such as a piano and which finger should be used to play different notes. Teaching the musical notes for piano involves a staff or stave, which is a set of five horizontal lines and four spaces between them, each line or space representing a different musical pitch. Students often get confused and frustrated due to difficulty in remembering which notes are represented by which staff positions correspond to a clef placed at the beginning of the staff. Clef is a music-notation symbol placed at the beginning of a music staff, which indicates the pitch of the notes on the staff. Clefs include a treble clef, bass clef, alto clef, and occasionally tenor clef.

Some teachers use the phrase "Every Good Boy Does Fine" to teach treble and bass clef staffs to students. Teachers use the phrase "Every Good Boy Does Fine," as each line starts with the first letter of each word. This requires the student to memorize the lines of the staff and placement of the notes. Memorizing the lines of staff is non-intuitive and always a point of confusion for students learning piano and other keyboard musical instruments. Further, the cognates only apply to English making it difficult for non-English speaking students.

In order to overcome these difficulties, several devices have been proposed in the past. One such example is disclosed in a United States granted U.S. Pat. No. 8,664,502, entitled "System and Method for Musical Education" ("the '502 Patent"). The '502 Patent discloses a method of locating, discovering, and memorizing the names of the notes for acoustic and electric stringed keyboard musical instruments. The method includes joining the frontal view of the fingerboard of the instrument with a labelled virtual view of the fingerboard applied to the back of the instrument neck in a location corresponding to respective frets on the front.

Another example is disclosed in a United States granted U.S. Pat. No. 7,629,527, entitled "Machine and Method for Teaching Music and Piano" ("the '527 Patent"). The '527 Patent discloses a method and system of teaching music that uses modified representations of the musical score, an interactive visual feedback describing the musical tones played on a musical device, and the marking of piano keys or other control instrumentalities of a musical device. This system helps students to recognize musical notes and piano keys, and to associate each note with the correct piano key. The modification of the musical score includes a vertical presentation of the musical staves, different colors of the staff lines for different staves, pictographs denoting the sol-fa names of the musical notes, and different representations of the musical notes on or between the staff lines. The marking of piano keys includes the application of colorful labels to distinguish the piano keys and associate them with musical notes and staves. A gradual transformation of the music score back to the standard music representation teaches students to read the standard music notation.

Another example is disclosed in a United States granted U.S. Pat. No. 6,881,887, entitled "Teaching Method and Guides to Teach Piano" ("the '887 Patent"). The '887 Patent discloses a guide with vertical numerically color coded lines on it. The guide can then be moved along the space between the keys and the fallboard of the piano, so that the keys can be played by anyone placing their fingers on the keys indicated by the lines on the guide. Sheet music is prepared with numbers and colors juxtaposed to the notes corresponding to the lines, so that the piano student will know which keys to stroke.

Yet another example is disclosed in a United States granted U.S. Pat. No. 7,005,569, entitled "Method for Imparting Music Score Reading and Keyboard Performance Skills" ("the '569 Patent"). The '569 Patent discloses a method which facilitates for players the learning of music reading in the playing of keyboard musical instruments, which comprises the steps of providing a plurality of musical staves, musical notes, and letters of the alphabet corresponding to the musical notes; and causing the player to play sequentially pairs of musical notes by striking corresponding keys on the keyboard.

Yet another example is disclosed in a United States granted U.S. Pat. No. 4,246,827, entitled "Device for Teaching Music" ("the '827 Patent"). The '827 Patent discloses a device for teaching music comprising, in combination, a set of pegs or keys subdivided into seven groups corresponding to the seven musical notes, a set of cards obtained by a sheet material, each card containing a musical passage consisting of coded insertion slots corresponding to the notes of the passage, and means for reproducing the sounds corresponding to each of the seven notes when the respective pegs selectively associated with each insertion slot are first introduced into said insertion slots, and then sequentially depressed.

The traditional method of teaching music and the above discussed disclosures include an inconsistent and mismatched set of tools from decades ago, which frustrate and confuse the students so that they become uninterested or less interested in music. These antiquated methods focus on repetition and note learning rather than simplifying the principles of music. Further, no explanation of music can be offered during the first few weeks of teaching music using the above discussed disclosures.

Therefore, there is a need for a device for teaching music to a student that is more efficient and appealing at the beginning stage of music reading, writing and playing a keyboard musical instrument such as a piano.

SUMMARY OF THE INVENTION

It is an object of the present invention to provide a device for teaching or learning music that avoids the drawback of known devices.

It is another object of the present invention to provide a device for teaching music to a student or musical novice with the use of pegs and interchangeable clefs.

In order to overcome the limitations here stated, the present invention provides a device for teaching music to a student or musical novice. In one implementation, the device includes a board. The board presents a staff having five (5) horizontal lines and four spaces between the lines while adding two (2) Middle-C's on ledger lines, one below the staff on lower left and the other on right top above the staff. The board encompasses a plurality of first insertion slots corresponding to the name of note on any line or space of the staff. The plurality of first insertion slots matches keys, i.e., the white keys, of a keyboard musical instrument such as a piano. In one example, the plurality of first insertion slots represents treble clef notes and corresponds to the white keys of the piano: Middle C, 11 keys upwards by step, a 13th note above the staff, and Middle-C of the bass clef. Further, the board encompasses a plurality of second insertion slots that correspond to indicia governing the plurality of notes (first insertion slots). In other words, the plurality of second insertion slots positioned parallel to the plurality of first insertion slots for inserting pegs to indicate signs governing change in pitch, or ornamentation, applied to the first insertion slots.

The plurality of first insertion slots receives a plurality of first pegs. Similarly, the plurality of second insertion slots receives a plurality of second pegs with options such as sharp, flat, or instructions for repeat or ornamentation (trills, turns, etc.). Further, the board presents a clef, such as a G-clef or F-clef (or other clefs), at the beginning or one side of the staff. The clef governs the pitch of the rest of the notes of the staff. A teacher arranges or places the first pegs and second pegs in the first insertion slots and second insertion slots, respectively, corresponding to the pitches to be played on the keyboard. A student sees the placement of the first pegs and second pegs, considers the steps or skips represented by the pegs, and follows the order of the pegs to play the resulting melody.

In one advantageous feature of presently disclosed invention, the clefs are interchangeable by the teacher to serve learning bass, treble or alto clef notes from the same staff. Interchanging of the clefs allows to increase efficiency in learning and increase interest in the use of the device as a useful tool. Further, the device draws attention to the function of a clef as established in music history.

In another advantageous feature of presently disclosed invention, the device allows students to read and learn notes (first pegs) and accidentals (second pegs) at the beginning stage of music reading, writing and playing (not postponing accidentals as a more difficult step). Students learn to follow the placement of the pegs in a 12-note range without confusion. Over a period of time, the students themselves can place or remove first pegs and second pegs to read and write music notes of their own choosing. The device presents a self-correcting method of teaching sight-reading, as well as a useful peer teaching activity. The device helps to take the confusion away from notes on a written page where the skips are not obvious. Further, the device provides time for a musical novice to comprehend the new language of music by allowing him to learn melodic movement first.

In another advantageous feature of presently disclosed invention, the device provides a simple and easy means to teach music to a musical novice or a beginner. The device helps the user/student to advance with more acuity and speed than traditional method books centered around Middle-C. The students can use fingers of both hands which intertwine to find the notes. Time spent on finger numbering and hand position is postponed until good playing of melodies is achieved. Finger choices follow the individual student's instinct to find the tone to make the melody. Humming and singing along with the melody is a natural and wholesome activity and builds pitch memory through the feel of the sung notes.

In another advantageous feature of presently disclosed invention, the device acts as a teaching device that challenges the customary practices and advocates teaching melody first without distracting the students through superfluous expectations such as counting, finger numbers, and note-naming. The device presents a guide to students to read and play music sooner. The one-panel staff with interchangeable clefs is streamlined to present an efficient way to display notes in one staff and simultaneously play them on a sounding keyboard. With this, the student builds hearing, singing, and understanding of melodic movement through tactile sense by simultaneously touching a peg location on the staff and its location on the keyboard.

The disclosed subject matter provides numerous technical advantages that are both novel and non-obvious. The present disclosure provides a device and method of teaching music reading and playing of great benefit to beginning or novice student and has the following advantages over conventional method books and historical teaching practices. With the aid of disclosed subject matter, students can immediately enjoy playing an instrument, while gradually learning conventional notation.

The disclosed subject matter provides a method of reading music nomenclature and playing a keyboard instrument that reduces the complexity of different visual elements which appear in traditional music nomenclature. The disclosed subject matter reduces the complexity of music to the study of only melody notes presented without nomenclature for duration or rhythm. The disclosed subject matter reduces the number of written notes out of all available notes to the 12 notes displayed on one staff including Middle-C. The disclosed subject matter includes the presentation of indicia associated with all 12 notes. The disclosed subject matter displays the 12 notes and indicia in fixed position ascending or descending by step on the music staff of disclosed invention. The subject matter of the present disclosure guides the student to associate and sound out the 12 notes displayed on the disclosed invention to the corresponding 12 white keys of a keyboard.

In addition, the presently disclosed subject matter instructs the student to interpret and sound out the pitch changes indicated by indicia associated with the 12 notes on the disclosed invention. The disclosed subject matter directs the student to touch the note symbol on the apparatus, play the corresponding key on the keyboard, and match its pitch in singing. The disclosed subject matter encourages the student to manipulate on the disclosed invention the possibilities of the 21 semi-tones associated with the 12 notes on the music staff and play them. The disclosed subject matter guides the student in how to arrange and rearrange the order of those tones through the organizing structure of the proposed invention and sound out the tones. The disclosed subject matter guides the student in how to follow the order of the tones displayed on the disclosed invention and to discover favorite melodies composed from those tones or further to create a new melody.

A significant technical advantage of the disclosed subject matter is providing the student in postponing drills and memorization of note names until student interprets basic melodic pattern. The disclosed subject matter allows the keyboard musical instrument student to further follow directional signals from a teacher or leader for note selection and playing. Moreover, the disclosed subject matter further correlates the note position on the proposed invention to its key on the keyboard.

Features and advantages of the invention hereof will become more apparent in light of the following detailed description of selected embodiments, as illustrated in the accompanying figures. As will be realized, the invention disclosed is capable of modifications in various respects, all without departing from the scope of the invention. Accordingly, the drawings and the description are to be regarded as illustrative in nature.

BRIEF DESCRIPTION OF THE DRAWINGS

The present invention will now be described in detail with reference to the drawings, which are provided as illustrative examples of the invention as to enable those skilled in the art to practice the invention. It will be noted that throughout the appended drawings, like features are identified by like reference numerals. Notably, the figures and examples are not meant to limit the scope of the present invention to a single embodiment, but other embodiments are possible by way of interchange of some or all of the described or illustrated elements and, further, wherein:

FIGS. 7 through 8C show the first peg and second pegs;

DETAILED DESCRIPTION OF THE EMBODIMENTS

The detailed description set forth below in connection with the appended drawings is intended as a description of exemplary embodiments in which the presently disclosed invention may be practiced. The term "exemplary" used throughout this description means "serving as an example, instance, or illustration," and should not necessarily be construed as preferred or advantageous over other embodiments. The detailed description includes specific details for providing a thorough understanding of the presently disclosed device. However, it will be apparent to those skilled in the art that the presently disclosed invention may be practiced without these specific details. In some instances, well-known structures and devices are shown in functional or conceptual diagram form in order to avoid obscuring the concepts of the presently disclosed device.

In the present specification, an embodiment showing a singular component should not be considered limiting. Rather, the invention preferably encompasses other embodiments including a plurality of the same component, and vice-versa, unless explicitly stated otherwise herein. Moreover, the applicant does not intend for any term in the specification to be ascribed an uncommon or special meaning unless explicitly set forth as such. Further, the present invention encompasses present and future known equivalents to the known components referred to herein by way of illustration.

Although the present disclosure provides a description of a device for teaching music, it is to be further understood that numerous changes may arise in the details of the embodiments of the device. It is contemplated that all such changes and additional embodiments are within the spirit and true scope of this disclosure.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure.

Figure 1:
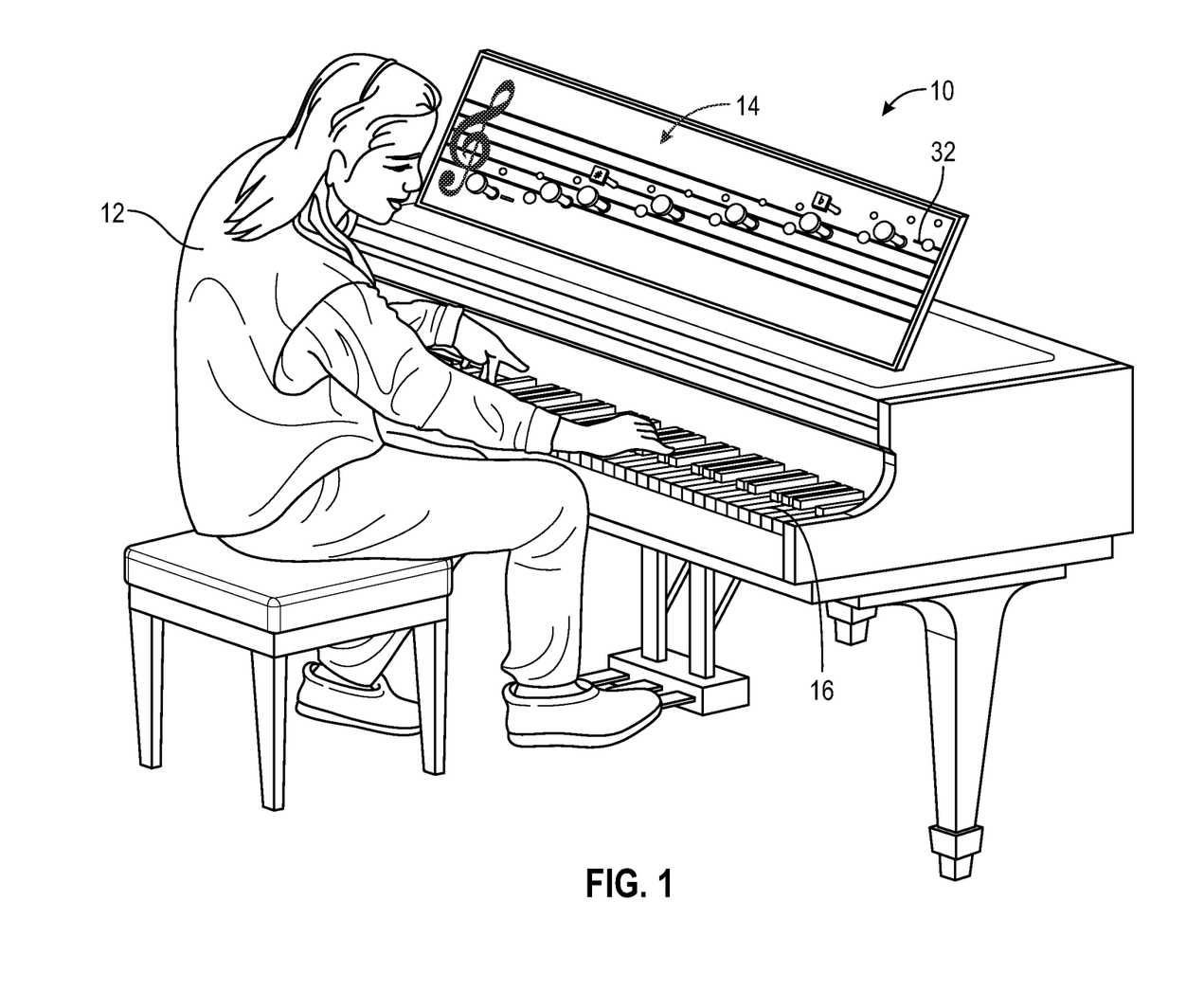
FIG. 1 illustrates an environment in which a user uses a device to play music on a keyboard musical instrument such as a piano, in accordance with one exemplary embodiment of the present invention.
Figure 2:
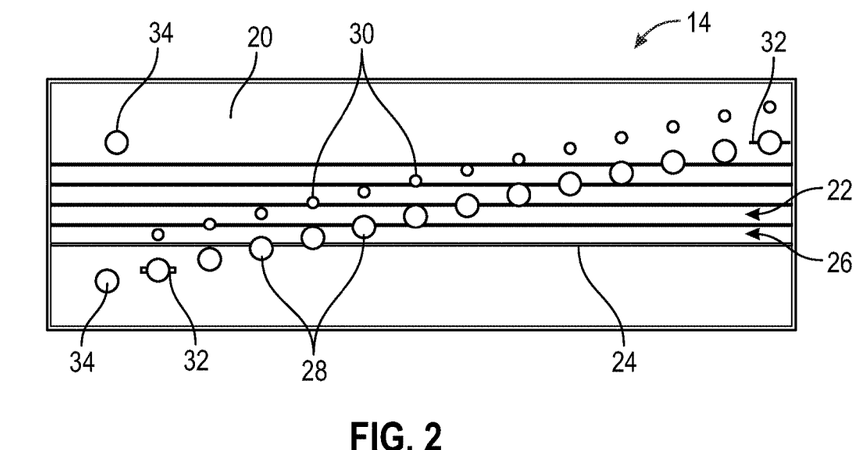
FIG. 2 shows the device having 13-pairs of insertion slots corresponding to notes and indicia above the note.

In one embodiment, the present invention discloses a device for teaching or learning music. FIG. 1 shows environment 10 in which user 12 uses device 14 as a reference or guide to playing/learning music on keyboard musical instrument 16. Keyboard musical instrument 16 includes, but not limited to, a piano, organ, keyboard or any other keyed keyboard musical instrument. Here, user 12 includes a music teacher, leader, student, or musical novice. FIG. 2 shows a front view of device 14, in accordance with one embodiment of the present invention. Device 14 includes board 20. Board 20 provides a material made of plastic, wood, metal, or any other suitable material. Board 14 comes in a rectangular configuration. However, board 14 may come in a variety of sizes based on the preference of user 12. Board 20 presents staff or stave 22 having five (5) horizontal lines 24 and four spaces 26 between lines 24 as well as Middle-C.

In accordance with the present invention, board 20 encompasses a plurality of first insertion slots 28 arranged in a series. Each plurality of first insertion slots 28 indicates a name of note on any line 24 or space 26 of staff 22. As can be seen, each plurality of first insertion slots 28 is positioned between horizontal lines 24 and spaces 26. In the present embodiment, plurality of first insertion slots 28 includes thirteen (13) insertion slots. Plurality of first insertion slots 28 matches keys i.e., white keys of keyboard musical instrument (piano) 16. In one example, plurality of first insertion slots 28 represents a treble clef (G-clef) and matches the white keys of keyboard musical instrument 16, Middle C, and 11 keys upwards.

Further, board 20 presents a plurality of second insertion slots 30 arranged in a series. In the present embodiment, plurality of second insertion slots 30 includes thirteen (13)

insertion slots. Here, plurality of second insertion slots 30 runs parallelly to the plurality of first insertion slots 28. As can be seen from at least FIG. 2, each of plurality of second insertion slots 30 positions adjacent to a first insertion slot of plurality of first insertion slots 28. In one embodiment, plurality of first insertion slots 28 i.e., each of first insertion slot 28 and last insertion slot 28 (also termed as terminal insertion slots) encompasses ledger line 32 to indicate a note outside lines 24 and spaces 26 of regular staff 22. Ledger line 32 sits parallelly to staff 22. In the current embodiment, the position of plurality of first insertion slots 28 indicates the placement of musical notes i.e., seven different letter names i.e., "A" through "G" and repeats. Further, the position of a plurality of second insertion slots 30 allows the placement of indicia such as # and b, i.e., the accidental signs in accordance with plurality of first insertion slots 28 or plurality of first pegs 40.

Figure 3:
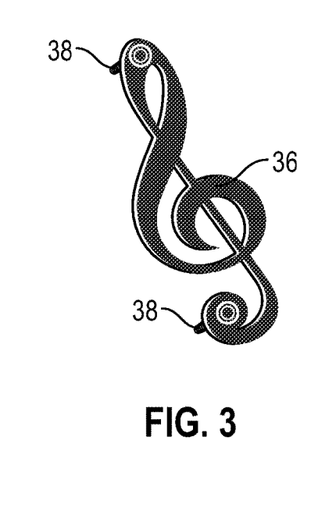
FIG. 3 shows a clef having protrusions for precise placement on a board.
Figure 4:
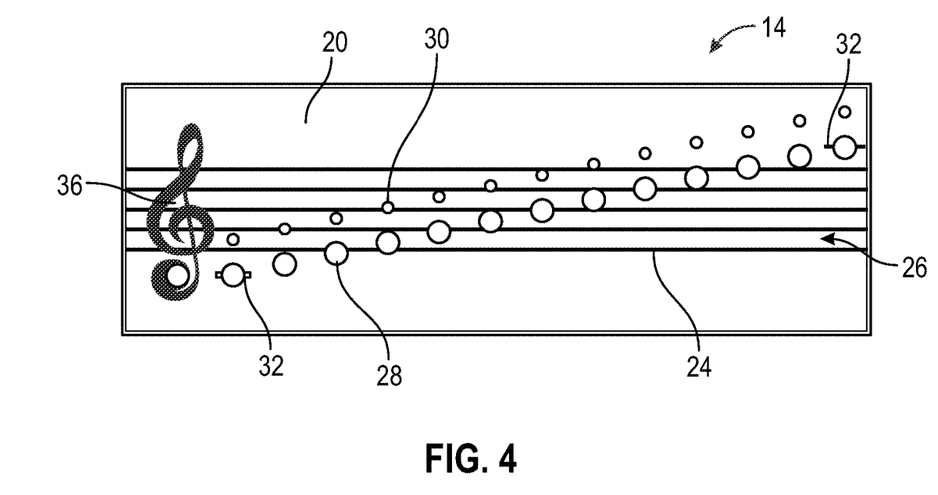
FIGS. 4, 5 and 6 show different clefs mounted to a board.
Figure 5:
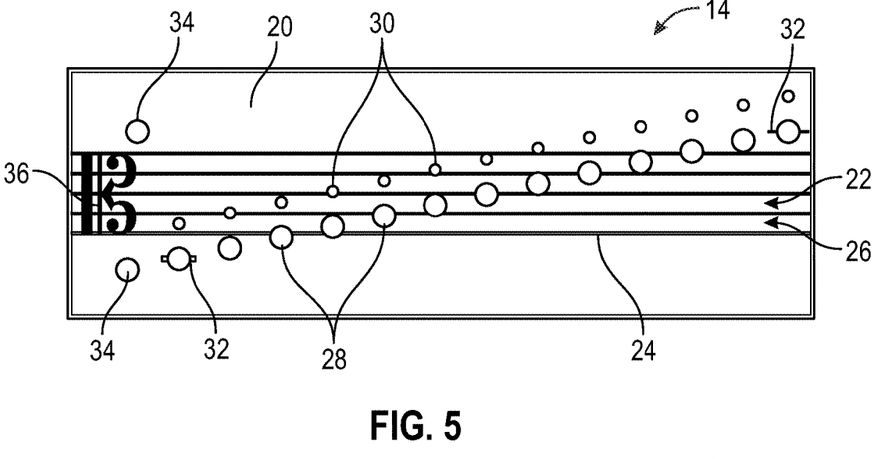
Figure 6:
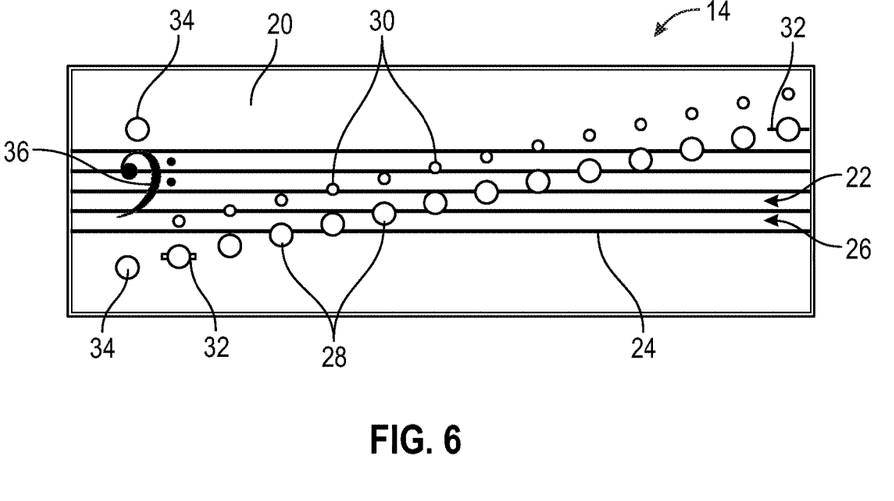

In the current embodiment, board 20 presents clef receiving insertion slots 34 for receiving clef 36 at the beginning or side of board 20. As known, clef 36 represents a musical symbol indicating the pitch of the notes (i.e., plurality of first insertion slots 28). Clef 36 includes G-clef (treble clef), C-clef (alto clef), or F-clef (bass clef). For ease of reference and explanation, G-clef as shown in FIG. 3 is preferred in the present invention. However, a person skilled in the art appreciates that C-clef or F-clef replaces G-clef for teaching music without deviating from the scope of the present invention. Here, clef 36 presents protrusions 38 configured to enter clef receiving insertion slots 34 and connect clef 36 to board 20. FIG. 4 shows clef 36 connecting to board 20. Clef 36 connects to board 20 at the beginning or side to indicate the name and pitch of the notes (i.e., plurality of first insertion slots 28) on that line 24. Further, FIGS. 5 and 6 show clefs 36 i.e., C-clef (alto clef) and F-clef (bass clef) connecting to board 20, respectively, in accordance with one exemplary embodiment of the present invention.

Figure 7:
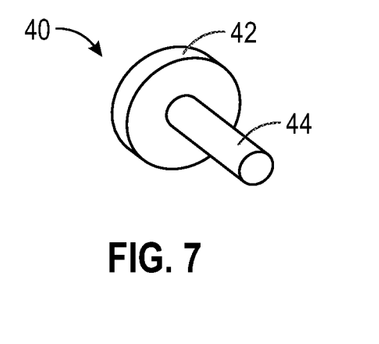

Further, device 14 provides a plurality of first pegs 40. Plurality of first pegs 40 enters plurality of first insertion slots 28 to indicate notes corresponding to the pitch. FIG. 7 shows first peg 40. First peg 40 provides a material made of plastic, wood, metal, or any other suitable material. Each of the plurality of first pegs 40 presents head portion 42 and an elongated portion 44 that extends from head portion 42. Here, elongated portion 44 takes the shape of first insertion slot 28 such that elongated portion 44 firmly sits in first insertion slot 28.

Figure 8A:
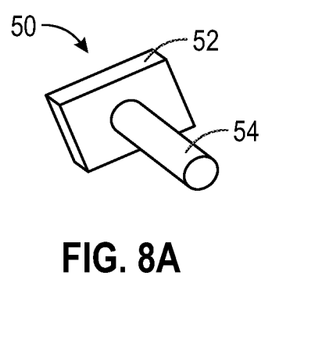
Figure 8B:
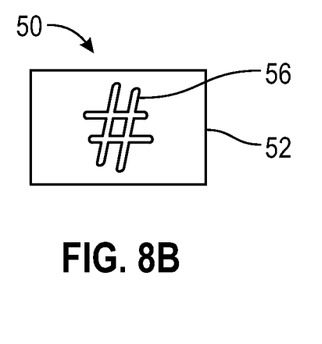
Figure 8C:
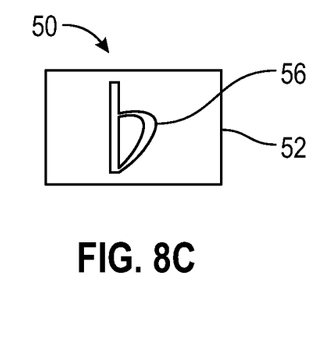
Figure 9:
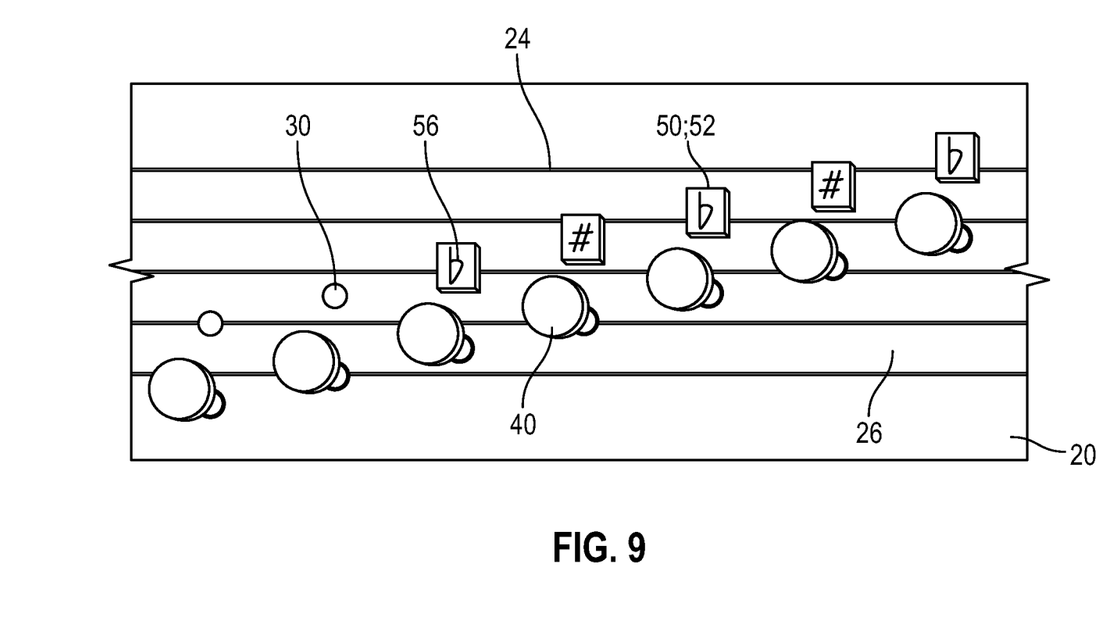
FIG. 9 shows a feature of first pegs and second pegs mounted to the board.
Figure 10:
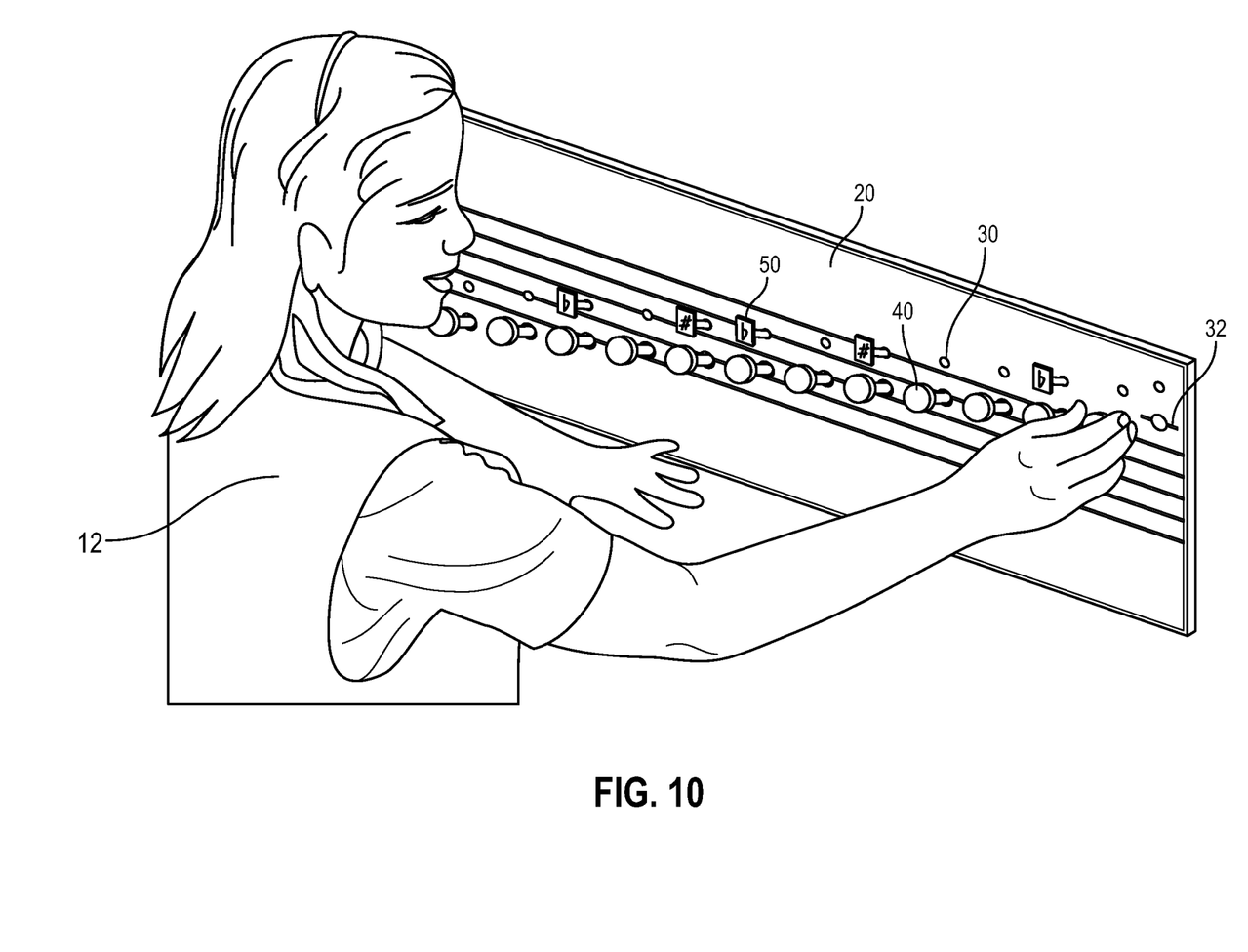
FIG. 10 shows a feature of the user placing first pegs and second pegs corresponding to the pitch.

Further, device 14 provides a plurality of second pegs 50. Plurality of second pegs 50 enters plurality of second insertion slots 30 to indicate symbols which alter the pitch. FIG. 8A shows second peg 50. Second peg 50 provides a material made of plastic, wood, metal or any other suitable material. Each of the plurality of second pegs 50 presents head portion 52 and elongated portion 54 that extends from head portion 52. Here, elongated portion 54 takes the shape of second insertion slot 30 such that elongated portion 54 firmly sits in second insertion slot 30. In the current embodiment, head portion 42 of first peg 40 differs from head portion 52 of second peg 50 for easy identification. For example, head portion 42 comes in a circular configuration and head portion 52 comes in a rectangular configuration. Person skilled in the art understands that user 12 selects different shapes to differentiate them from one another. User 12 places indication marks 56 such as b and # at the top of head portion 52. FIGS. 8B and 8C show exemplary second pegs 50 having indication marks 56 at the top. FIG. 9 shows an exemplary embodiment of plurality of second pegs 50 with indication marks 56 placed in plurality of second insertion slots 30 corresponding to notes i.e., plurality of first pegs 40 in plurality of first insertion slots 28. User 12 selects clef 36 and arranges the pitch by placing plurality of first pegs 40 in plurality of first insertion slots 28 and placing plurality of second pegs 50 in plurality of second insertion slots 30. FIG. 10 shows an exemplary embodiment of user 12 arranging plurality of first pegs 40 and plurality of second pegs 50. A person skilled in the art appreciates that user 12 places plurality of second pegs 50 (XX) with options such as sharp, flat, or instructions for repeat or ornamentation (trills, turns, etc.).

Figure 11:
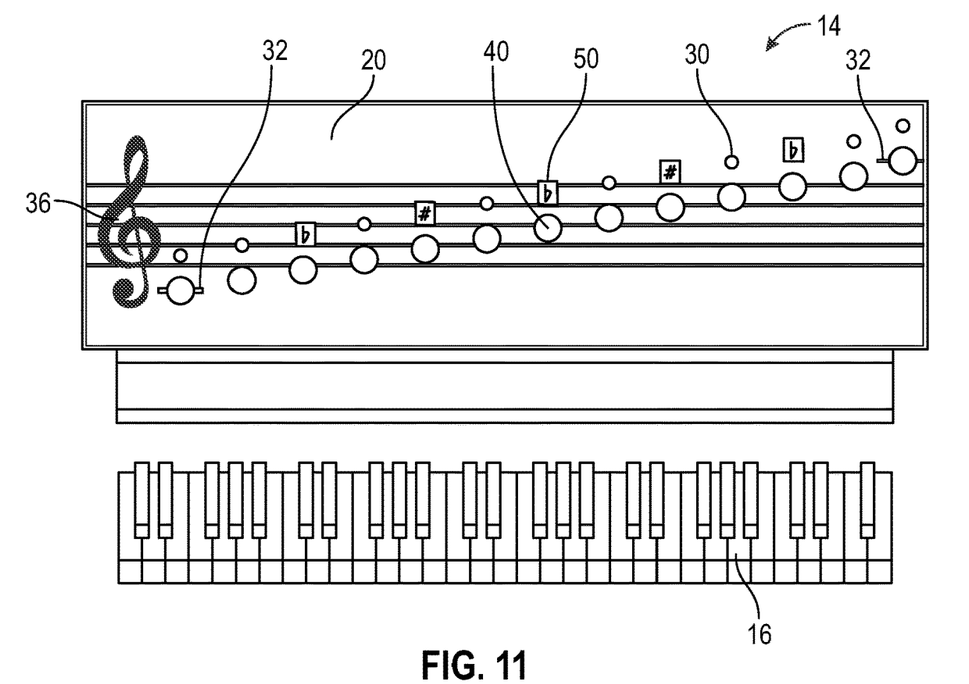
FIG. 11 shows the board placed on the music stand above the keyboard musical instrument, a piano.

User 12 mounts clef 36 based on the written music for keyboard musical instrument 16 and voices. Further, user 12 places plurality of first pegs 40 and plurality of second pegs 50 corresponding to the written music. Subsequently, user 12 places board 20 in his sight, say above keyboard musical instrument 16 (FIG. 11) and plays music. In the current embodiment, plurality of first insertion slots 28 i.e., 13 insertion slots allow exchanging position of clef 36 and the position of Middle-C to move from bottom to the top of staff 22. In other words, device 14 allows user 12 to change or exchange manuscripts such as exchanging a clef sign (clef 36, from G-clef to C-clef or F-clef, or vice versa) and the position of Middle-C to move from bottom to the top of staff 22 (or vice versa). For example, in the bass clef, the lowest note on the staff is an F. The E made from ledger line 32 is not useful to bass clef and is hidden from view through use of a clinging or sticky patch. User 12 undertakes two motions to change or reorient the staff when a clef is exchanged. First, user 12 removes one clef and affixes the alternate clef in its position at the start of the staff and then disguises or hides the resulting "extra" note with an opaque patch. A low "E" is not included as part of the staff in bass clef and a high "A" is not included as part of the treble clef. This way, user 12 applies the first principles of musicianship i.e., learn to read, play, and sing the tones of the staff first. In the present embodiment, only one ledger line 32 is included at the beginning of instruction i.e., Middle C.

The presently disclosed device helps to teach music to students and/or musical novices by placing plurality of first pegs and plurality of second pegs to help students to read notes (first pegs) and accidentals with indicia (second pegs) at the beginning stage. Students learn music by looking at the placement of the pegs without any confusion. Over a period of time, students themselves place or remove first pegs and plurality of second pegs to take away visual confusion comprehending better the language of music through logic and common sense. Likewise, when advancing to chord-playing, i.e., playing more than one note at a time. For example, pegs representing chord tones are removed from the array of 12 pegs revealing prominently the empty insertion slot. In this activity, user 12 writes the chords copying the notes one by one onto paper exactly as the empty insertion slots appear on the board. This procedure is a first transitional step for user 12, say the student to learn traditional note-reading and writing.

Device 14 allows to interchangeably place the pegs depending on the notes in a simple and effective manner. The interchangeability of pegs provides an efficiency of a single-clef model for both teacher and student and simplicity to the student. Device 14 provides an orderly and logical process of music reading, writing and playing piano. For example, the pegs allow to read count the alphabet for Bass clef note in downward or backward from Middle-C and count the treble clef upward or forward from Middle-C. This way of reading the note names does not require memorization before playing them as the bass clef is a logical continuation of the treble clef (or vice versa). Optionally, user 14 sings along while playing piano, which allows him/her to practice or foster his/her singing ability.

Figure 12:
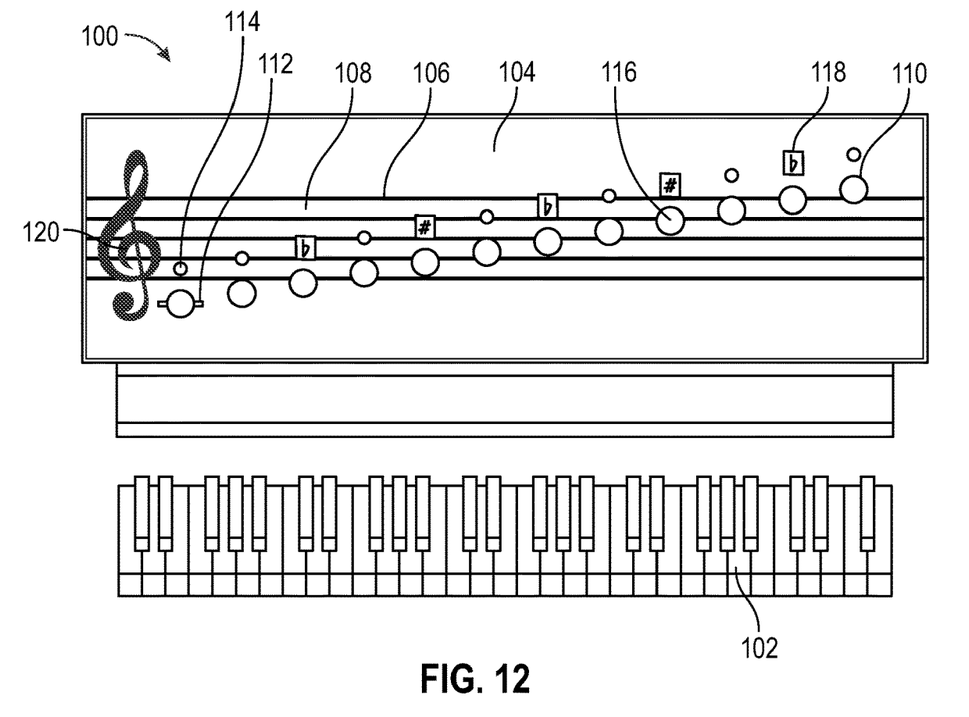
FIG. 12 shows a board having 12-insertion slots placed on the music stand above a keyboard musical instrument, in accordance with another embodiment of the present invention.

FIG. 12 shows a device 100 having 12-insertion slots for teaching music, in accordance with another embodiment of the present invention. In the current embodiment, a user (not shown) places device 100 above a keyboard musical instrument 102 such as a piano. Here, device 100 includes board 104 having five (5) horizontal lines 106 with spaces 108 between them. Board 104 encompasses a plurality of first insertion slots 110 (similar to first insertion slots 28). The last insertion slot of plurality of first insertion slots 110 presents ledger line 112 to indicate a note outside lines 106 and spaces 108. Here, plurality of first insertion slots 110 includes twelve (12) insertion slots. Position of the plurality of first insertion slots 110 indicates the placement of musical notes i.e., seven different letter names i.e., "A" through "G". Plurality of first insertion slots 110 matches keys, i.e., white keys of keyboard musical instrument (piano) 102. In one example, plurality of first insertion slots 110 represents a treble clef (G-clef) and matches the white keys of keyboard musical instrument 102, Middle C, and 11 keys upwards.

Further, board 104 presents a plurality of second insertion slots 114 (similar to second insertion slots 30). Here, plurality of second insertion slots 114 run parallelly to the plurality of first insertion slots 110. Position of plurality of second insertion slots 114 indicates options such as sharp, flat, or instructions (XX) for repeat or ornamentation (trills, turns, etc.). Plurality of first insertion slots 110 receives plurality of first pegs 116. Plurality of second insertion slots 114 receives plurality of second pegs 118. Further, board 104 includes clef 120 placed at the beginning of the staff to indicate a pitch of the notes i.e., plurality of first pegs 116.

The present embodiment illustrates 12-insertion slots version of board 20 shown in FIG. 1 (FIG. 1 shows 13-insertion slot version). The user operates device 100 similar to the explanation provided above. Person skilled in the art appreciates that a board with more or less than 12 insertion slots may also be used to teach music to students and such modifications fall within the scope of the presently disclosed invention.

In one exemplary embodiment, device 14 or device 100 presents a subtracting method for user 12 to learn melodic reading. Considering the 12-insertion slots device 100, a few pegs 116 are removed from insertion slots 116. For example, a chord (3 notes or more played together) can be learnt by subtracting a few notes, leaving the rest and then playing the empty insertion slots. The empty insertion slots represent what is written on paper. The subtracting method acts as a transition activity to traditional note reading, stacking the notes, etc., to find the tonic and so forth. For example, user 12 removes low E, middle G and A, high C" and A C6 chord in $1^{st}$ inversion. Subsequently, user 12 plays them together and chants the words to the Christmas tune.

When compared with the traditional method, which focuses endlessly on writing x's for skips where student feverishly studies a printed line of music and marks the skips with x's, the subtracting method presents an improved way of reading, stacking the notes, etc., to find the tonic and so forth.

In use, a leader such as a teacher selects which pegs the student will play by pointing to one after the other and finding their location on the keyboard. The student plays along following the directions, each in turn, to create the chosen melody. Orientation to the keyboard musical instrument (e.g., keyboard) and its groupings, and the introduction to the line-space system of music notation forms the basis of the first lesson in teaching music. By having the ability to see a note on the staff i.e., a peg makes the pitch on the keyboard musical instrument (with any finger number) and frees up time to learn immediately the line-space-line-space movement of music notation. The Middle-C of the staff and the Middle-C of the keyboard musical instrument correspond as the starting place for counting notes. Here, the peg acts as a sounding symbol. The student understands the music using the peg on the staff and the note on the keyboard musical instrument. The twelve tones rise and fall together. The tactile sense shared between the keyboard and the pegs builds note reading and performance skills quickly. The device allows the student time to study only the melodic movement and to focus on finger coordination.

For example, consider the student needs to learn and play "Ode To Joy" (Beethoven). For playing "Ode To Joy", the student needs to know where to begin and which key on the keyboard musical instrument to play next. Here, the student looks at the pegs, follows the teacher's direction and plays the next peg, irrespective of the finger, which develops the melody. Alternatively, the teacher may also affect the playing of the tune by just pointing to keys on the keyboard musical instrument, one by one, and have the student copy. The teacher teaches the line to space movement on the 5-line staff and empty insertion slot to create an experience to skip over it. The student's own placement of the pegs and then trying out the corresponding tones builds independence and confidence.

The music-pegs and white notes on the keyboard form a direct relationship to learn the music. At first, the pegs are stationery in their position and their usual position should be one as fully inserted into the insertion slots. The pegs are intended to be played and they are mute beacons otherwise. The unneeded pegs, ones not a part of a certain melody, may be intentionally removed to leave an empty insertion slot, or conversely, remain in the insertion slot and just passed over by the leader. The removal of unneeded pegs from the whole array of pegs is called as "subtraction method" as presented above. The board stays full when there is no substation of the pegs. When the pegs are in their place, every note is a possible choice waiting to sound out, waiting to be chosen. Certain melodies require only a few tones. The pegs that remain in the insertion slots provide a logic to the student by having to choose one. At the beginning of music learning, the presently disclosed device imparts an abstract system of line-space notation. This knowledge increases learning very easily and improves the success of playing piano in the future.

The presently disclosed device provides a new and better way to organize note-reading and performing music at the piano through tactile sense association. The device replicates all 11 notes and Middle-C on a grooved 5-line staff. An interchangeable clef option places the staff in treble or bass range. The user, such as a student, follows the order of pegs as selected by the leader and plays the associated notes on a keyboard, and sings along. The device presents an improvement over the existing art and builds on historic best practices to teach directional or intervallic note-reading and note-playing. The device fosters logical patterns of thoughts of the student and builds lasting memory through the power of muscle memory, visual acuity, and pleasurable sounds. Further, the device helps the teacher to teach independence while encouraging curiosity and further exploration of musical sounds in the students.

The presently disclosed device introduces simple melodic movement, without rhythmic notation, to teach music notation sooner and easier to students who are just beginning to learn music. By touching the pegs and singing or playing any keyboard, the students create a lasting memory of notes and pitch acquired by actually handling the pegs and working out the corresponding pitches between them. The device can include at least three (3) interchangeable clefs such as treble, bass, and alto. The device allows the student to recognize small patterns of notes, starting with treble clef, while taking time at the start to decipher the line-space movement of notes, and quickly build a foundation formed through logic and common sense rather than mainly cognitive skills and memory.

The presently disclosed device provides a useful and novel method to guide a student to read and play music sooner. The one-panel staff with interchangeable clefs is streamlined and efficient to display notes in one staff and simultaneously play them on a sounding keyboard. The student builds hearing, singing, and understanding of melodic movement through tactile sense by simultaneously touching a peg location on the staff and its location on the keyboard.

Based on the above, it is evident that the device allows teachers to teach music to students or musical novices. Students read and learn notes (first pegs) and accidentals (second pegs) at the beginning stage of music reading and writing. Students learn music by looking at the placement of the pegs without any confusion. Over a period of time, students themselves can place or remove first pegs and second pegs to read and write music. The device helps to take the confusion away from notes on a written page which does not allow (on small gauge staff) for skips to be easily seen. Further, the device provides time for a musical novice to comprehend the new language of music by guiding him to learn melodic movement first. This overcomes problems found in the prior art where the devices themselves confuse the students by introducing color and gadgets which require extra-musical activities and games which focus on memorizing note names. The device disclosed here teaches and practices melodic reading in its plain form. Non-musical games and flash card drills usurp lesson time and steal time away from music-making and singing.

Pegs may come in a variety of colors depending on the need. In the case of excitable students, or timid ones, colors may prove distracting and exciting and slow down students by distracting them. Colors take away the pleasant and trusted appearance of notes moving stepwise. Students themselves add color in patriotism, school loyalty, or holidays. At a second level a colored peg may indicate the starting note of the melody or the keynote (tonic) or the scale. As students advance to actual scale playing, a colored tonic is desired, for scale study for the device expands to 12 tones rather than the customary 8 notes. Applicants or inventors of the present invention intend to market the devices as "A Musical Parent's Teaching Kit", "Piano Preview", "Music Pegs 3D", "Teach Your Classmate" "Teach Your Neighborhood" or any other suitable names. The disclosed subject matter provides numerous technical advantages that are both novel and non-obvious. The present disclosure provides a device and method of teaching music reading and playing of great benefit to beginning or novice student and has the following advantages over conventional method books and historical teaching practices. With the aid of disclosed subject matter, students can immediately enjoy playing an instrument, while gradually learning conventional notation.

The disclosed subject matter, therefore, provides a method of reading music nomenclature and playing a keyboard instrument that reduces the complexity of different visual elements which appear in traditional music nomenclature. The disclosed subject matter reduces the complexity of music to the study of only melody notes presented without nomenclature for duration or rhythm. The disclosed subject matter reduces the number of written notes out of all available notes to the 12 notes displayed on one staff including Middle-C. The disclosed subject matter includes the presentation of indicia associated with all 12 notes. The disclosed subject matter displays the 12 notes and indicia in fixed position ascending or descending by step on the music staff of disclosed invention. The subject matter of the present disclosure guides the student to associate and sound out the 12 notes displayed on the disclosed invention to the corresponding 12 white keys of a keyboard.

In addition, the presently disclosed subject matter instructs the student to interpret and sound out the pitch changes indicated by indicia associated with the 12 notes on the disclosed invention. The disclosed subject matter directs the student to touch the note symbol on the apparatus, play the corresponding key on the keyboard, and match its pitch in singing. The disclosed subject matter encourages the student to manipulate on the disclosed invention the possibilities of the 21 semi-tones associated with the 12 notes on the music staff and play them. The disclosed subject matter guides the student in how to arrange and rearrange the order of those tones through the organizing structure of the proposed invention and sound out the tones. The disclosed subject matter guides the student in how to follow the order of the tones displayed on the disclosed invention and to discover favorite melodies composed from those tones or further to create a new melody.

A significant technical advantage of the disclosed subject matter is providing the student in postponing drills and memorization of note names until student interprets basic melodic pattern. The disclosed subject matter allows the keyboard musical instrument student to further follow directional signals from a teacher or leader for note selection and playing. Moreover, the disclosed subject matter further correlates the note position on the proposed invention to its key on the keyboard.

A person skilled in the art appreciates that the device may come in a variety of sizes depending on the need and comfort of the user. For example, for presentation to a classroom or auditorium, an embodiment could extend in proportion to the original but much bigger. Further, many changes in the design and placement of components may take place without deviating from the scope of the presently disclosed device.

A person skilled in the art appreciates that the device may come in a variety of sizes depending on the need and comfort of the user. Further, different materials in addition to or instead of materials described herein may also be used and such implementations may be construed to be within the scope of the present invention. Further, many changes in the design and placement of components may take place without deviating from the scope of the presently disclosed device.

In the above description, numerous specific details are set forth such as examples of some embodiments, specific components, devices, methods, in order to provide a thorough understanding of embodiments of the present invention. It will be apparent to a person of ordinary skill in the art that these specific details need not be employed, and should not be construed to limit the scope of the invention.

In the development of any actual implementation, numerous implementation-specific decisions must be made to achieve the developer's specific goals, such as compliance with system-related and business-related constraints. Such a development effort might be complex and time-consuming, but may nevertheless be a routine undertaking of design, fabrication, and manufacture for those of ordinary skill. Hence as various changes could be made in the above constructions without departing from the scope of the invention, it is intended that all matter contained in the above description or shown in the accompanying drawings shall be interpreted as illustrative and not in a limiting sense.

The foregoing description of embodiments is provided to enable any person skilled in the art to make and use the invention. Various modifications to these embodiments will be readily apparent to those skilled in the art, and the novel principles and invention disclosed herein may be applied to other embodiments without the use of the innovative faculty. It is contemplated that additional embodiments are within the spirit and true scope of the disclosed invention.

What is claimed is:

1. A device for teaching or learning music, said device comprising:
    a board comprising horizontal lines, and spaces between said horizontal lines, wherein said horizontal lines and said spaces represent a musical staff;
    a plurality of first insertion slots arranged in said musical staff, wherein said plurality of first insertion slots matches keys of a keyboard musical instrument;
    a plurality of second insertion slots positioned directly above said plurality of first insertion slots, wherein each of said plurality of second insertion slots indicates an accidental sign positioning adjacent to a first insertion slot of said plurality of first insertion slots;
    a plurality of first pegs configured to insert in said plurality of first insertion slots;
    a plurality of second pegs configured to insert in said plurality of second insertion slots; and
    a plurality of interchangeable clefs placed adjacent to said musical staff;
    wherein said plurality of first pegs inserts in said plurality of first insertion slots, and said plurality of second pegs inserts in said plurality of second insertion slots, and
    wherein the placement of said plurality of first pegs and said plurality of second pegs corresponds to said clef and indicates at least one musical tone corresponding to a pitch produced by the keyboard musical instrument for teaching or learning music.

2. The device of claim 1, wherein the keyboard musical instrument comprises one of a piano, an organ, and a keyed keyboard musical instrument.

3. The device of claim 1, wherein each of said plurality of first insertion slots indicates a name of a note on a horizontal line of said musical staff.

4. The device of claim 1, wherein said clef comprises one of a bass, treble, alto and tenor clef symbol.

5. The device of claim 1, wherein said board comprises a clef receiving insertion slot, and wherein said clef receiving insertion slot receives said clef.

6. The device of claim 1, wherein a first peg of said plurality of first pegs comprises a head portion, and an elongated portion extending from said head portion.

7. The device of claim 6, wherein said elongated portion inserts in a first insertion slot of said plurality of first insertion slots.

8. The device of claim 1, wherein a second peg of said plurality of second pegs comprises a head portion, and an elongated portion extending from said head portion.

9. The device of claim 8, wherein said elongated portion inserts in a second insertion slot of said plurality of second insertion slots.

10. The device of claim 8, wherein said head portion of said second peg comprises indicia in accordance with the placement of a first peg of said plurality of first pegs adjacent to said second peg.

11. The device of claim 1, wherein a first insertion slot at an end of said plurality of first insertion slots comprises a ledger line.

12. The device of claim 1, wherein said plurality of first insertion slots comprises 12-insertion slots or 13-insertion slots.

13. The device of claim 1, wherein said clef interchanges and allows to move the position of Middle-C of said musical staff from bottom to the top of said musical staff.

14. A method of providing a device for teaching or learning music, said method comprising steps of:
    providing a board comprising horizontal lines, and spaces between said horizontal lines, said horizontal lines and said spaces representing a musical staff;
    providing a plurality of first insertion slots arranged in said musical staff, said plurality of first insertion slots matching keys of a keyboard musical instrument;
    providing a plurality of second insertion slots arranged in parallel to said plurality of first insertion slots, each of said plurality of second insertion slots indicating an accidental sign and positioning adjacent to a first insertion slot of said plurality of first insertion slots;
    providing for the student a piano or keyboard instrument with sounding notes made by student pressing a key;
    providing a plurality of first pegs for insertion in said plurality of first insertion slots;
    providing a plurality of second pegs for insertion in said plurality of second insertion slots; and
    providing a clef placed adjacent to said musical staff;
    providing for the student a music stand on the piano or keyboard instrument, said board supported and secured in place, easily visible by the student, and easily reachable the board surface and arranging and rearranging said first pegs and said second peg;
    and
    inserting said plurality of first pegs in said plurality of first insertion slots, and inserting said plurality of second pegs in said plurality of second insertion slots corresponding to said clef such that the placement of said plurality of first pegs and said plurality of second pegs indicates at least one musical tone corresponding to a pitch produced by said keyboard musical instrument for teaching or learning to read and play music.

15. The method of claim 14, further comprising:
    providing a clef receiving insertion slot at said board; and
    receiving said clef in said clef receiving insertion slot.

16. The method of claim 14, further comprising providing a head portion and an elongated portion for a first peg of said plurality of first pegs, said elongated portion extending from said head portion.

17. The method of claim 16, further comprising inserting said elongated portion in a first insertion slot of said plurality of first insertion slots.

18. The method of claim 14, further comprising providing a head portion and an elongated portion for a second peg of said plurality of second pegs, said elongated portion extending from said head portion.

19. The method of claim 18, further comprising inserting said elongated portion in a second insertion slot of said plurality of second insertion slots.

20. The method of claim 14, further comprising interchanging said clef for moving the position of Middle-C of said musical staff from bottom to the top of said musical staff.

* * * * *